Sept. 23, 1952     R. L. FRYER, JR     2,611,238
EXHAUST MANIFOLD FOR INTERNAL-COMBUSTION ENGINES
Filed Jan. 9, 1950
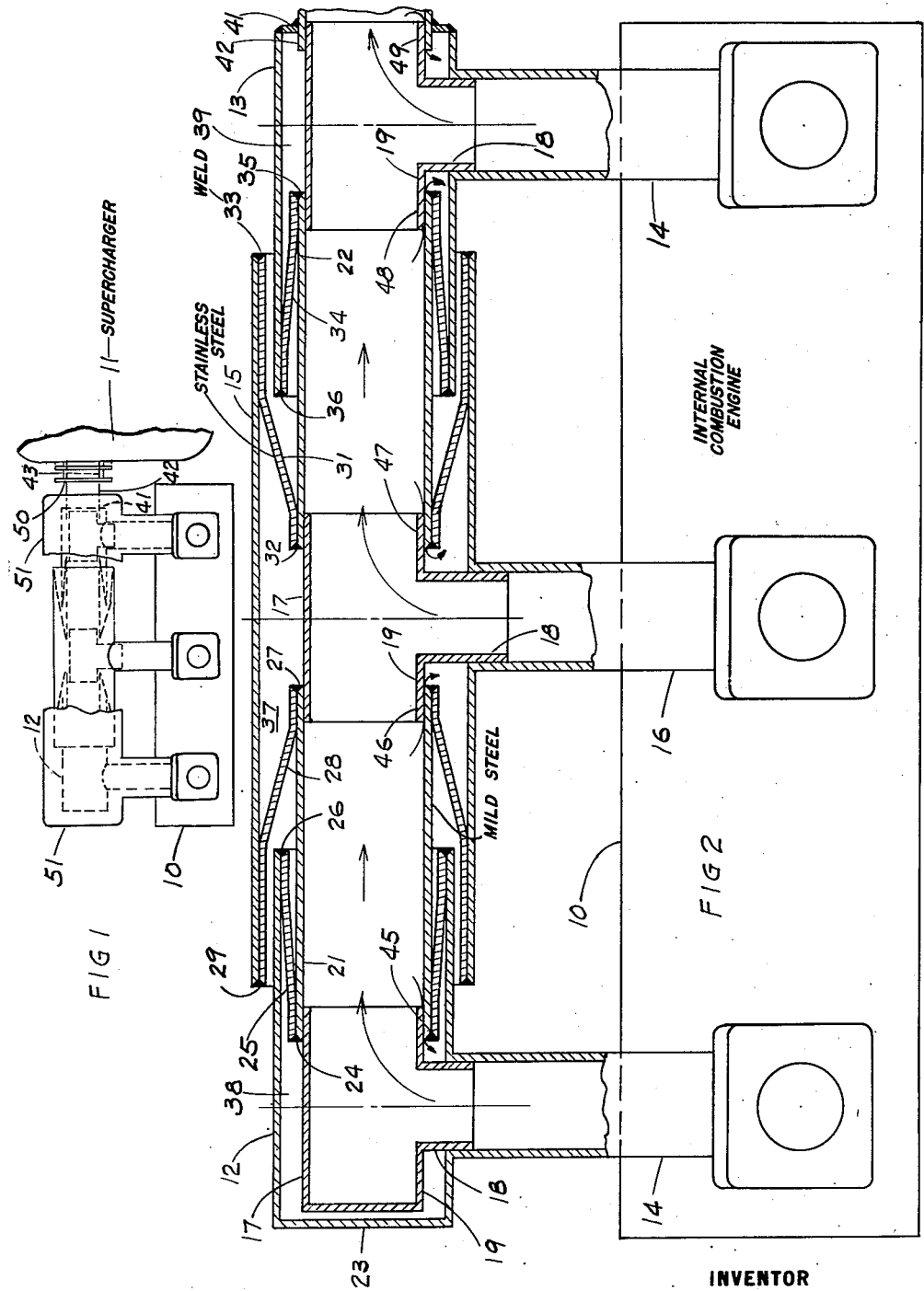
INVENTOR
ROSS L. FRYER, JR.
BY Maurice W. Grady
ATTORNEY Patented Sept. 23, 1952

2,611,238

UNITED STATES PATENT OFFICE 2,611,238

EXHAUST MANIFOLD FOR INTERNAL-COMBUSTION ENGINES

Ross L. Fryer, Jr., Schenectady, N. Y., assignor to American Locomotive Company, New York, N. Y., a corporation of New York Application January 9, 1950, Serial No. 137,647

11 Claims. (Cl. 60—29)

This invention relates to exhaust manifolds for internal combustion engines, and particularly to such a manifold having compensation means therein to absorb thermal expansion.

In the operation of diesel engines of the type used to drive the generator of electromotive locomotives, it is well known that the intense heat of the exhaust gases causes warping, buckling, and other forms of distortion in the exhaust manifold, both in the branches and in the main conduit. Manifolds in which the main conduit and the branches are of unitary construction become misaligned with respect to the exhaust ports. Furthermore, cracking of the pipes frequently results, particularly at the joints, and the escaping gases are annoying. Flexible couplings have been found to be impractical since the materials from which they are fabricated are either too expensive or not capable of withstanding the intense operative heat. Cooling means are undesirable because the heat provides the expansion of the gas necessary to drive the turbo-charger; and any diminution thereof, as by cooling jackets, disperses available energy. In fact, lagging is provided to enclose the manifold pipes to prevent heat radiation.

The principal object of the invention is to provide an exhaust manifold assembly so constructed that the linear expansion of its main conduit will be absorbed by a slip joint arrangement of the members comprising the conduit and so that the gases escaping through the slip joints will be confined in reservoirs mounted thereon.

Still another object is to provide such a manifold having its main conduit constructed of a plurality of members telescoped in slip fit relation to allow for linear expansion and having reservoir means adjacent the slip joints and in communication therewith to capture gas escaping through such joints.

Another object is to provide such a manifold assembly in which the main conduit is constructed as a unit comprising pipe sections in slip joint relation to provide for thermal expansion and in which the branch pipes are rigidly secured to the engine, connecting means being provided between the branch units and the main conduit unit so arranged that the branches support the conduit without substantially limiting the thermal expansion of the latter thereby to prevent warping, buckling, and other distortion in the assembly.

Still another object is to provide such an assembly including a main conduit constructed as a unit comprised of pipe sections in slip joint relation to provide for thermal expansion and branch units adapted for rigid securement to the engine, the branches having casing elements integrally formed therewith which are disposed in alignment surrounding the main conduit, said casings being connected to the conduit to support the latter and forming with the connecting means a reservoir adapted to capture any exhaust gases that may escape through the slip joints.

Another object is to provide such a construction in which the reservoirs are mounted upon the conduit by means adapted to compensate for the thermal expansion of the conduit and of the reservoirs.

Still another object is to provide a manifold assembly with such a conduit and reservoirs, the construction and arrangement of the reservoirs being such that casings ars disposed to surround the conduit members and are so connected thereto by means consisting of materials having relatively high thermal coefficients that compensation is provided for the expansion of the conduit and the walls of the reservoir.

Other and further objects of this invention will appear from the following description, the accompanying drawing and the appended claims.

Referring to the accompanying drawing, Fig. 1 shows in outline an exhaust manifold assembly connected to a turbo-supercharger (shown diagrammatically) and adapted for mounting upon an internal combustion engine; and Fig. 2 shows a manifold assembly, partly in section, and broken off at its forward end, with the apparatus of the invention arranged therein.

Referring now to Fig. 2, my invention is shown embodied in an exhaust manifold assembly mounted upon an internal combustion engine, diagrammatically indicated as 10, to extend longitudinally thereof to conduct the exhaust gases from the engine cylinders (not shown) to a turbo-supercharger 11 (Fig. 1) located at the end of the engine in conventional manner. A pair of casings 12 and 13 are disposed in substantial alignment, and from each of them extends a branch or collector pipe 14 adapted to provide passage to the manifold assembly for the products of combustion escaping from the exhaust ports of the engine cylinders. A third casing 15 is disposed with its end portions enclosing the end portions of casings 12 and 13 in spaced relation thereto. Casing 15 is also provided with a branch or collector pipe 16. Branch pipes 14 and 16 are rigidly secured to the cylinder heads by conventional means. Arranged within each of the casings 12, 13, and 15 are tubular T pipe fittings 17 the stems 18 of which are disposed in slip fit relation with the branches 14 and 16 and the cross portions 19 of which are disposed in substantial axial alignment with each other. Sleeves 21 and 22 telescopically engage the adjacent end portions of the T cross portions in slip fit relation. The assembly of the T fittings and the sleeves forms the main exhaust gas conduit of the manifold. Closure 23 may be welded to the rear end of casing or integrally formed therewith. The outside diameter of T fitting 17 disposed in the rear casing 12 plus the length of stem 18 is less than the inside diameter of casing 12 to provide clearance when the parts are assembled. The rear end of such T fitting is spaced from closure 23 to allow for thermal expansion.

The elements so far described, namely casings 12, 13, and 15, branch pipes 14 and 16, T fittings 17, closure 23, and the sleeves 21 and 22 are fabricated of a mild steel having a coefficient of thermal expansion of .0000065 per degree Fahrenheit. Arrows show the direction of flow of the exhaust gases from the engine cylinders toward the turbo-supercharger; and it can be seen from the description thus far given that such gases are transmitted from the cylinders through the branch pipes into the conduit formed by the telescoped T fittings and sleeves and from the conduit to the turbocharger.

Welded at 24 to the outside wall of the rear end of sleeve 21 and extending forwardly therefrom is an outwardly flared connecting tube 25 of stainless steel which is welded at its forward end at 26 to the inner wall of the forward end of casing 12. Welded at 27 to the outside wall of the forward end of sleeve 21 is a flared connecting tube 28 leading rearwardly and extending between the forward portion of sleeve 21 and the rear portion of casing 15 to the end of such casing where it is welded at 29 to the inside wall thereof. All welds so far described are annular and effect sealed joints impervious to the passage of gas therethrough. A similar but reverse construction in the form of a flared connecting tube 31 is provided between the rear end of sleeve 22 and the forward portion of casing 15. Such tube is welded at 32 to the outside wall at the rear end of sleeve 22 and extends outwardly and forwardly between the rear portion of casing 13 and the forward portion of casing 15 to the end of such casing where it is welded to the inside wall thereof at 33. Still another flared connecting tube 34 is welded at 35 to the outside wall of forward end of sleeve 22 and extends rearwardly and is welded at 36 to the inside wall at the rear end of sleeve 13. The stainless steel of which the tubes 25, 28, 31, and 34 are fabricated has a coefficient of thermal expansion of .0000110 per degree Fahrenheit. Such coefficient is of course considerably greater than the coefficient of .0000065 of the mild steel. In the apparatus of the illustrative embodiment mild steel having a coefficient of .0000065 and stainless steel having a coefficient of .0000110 have been described, but other mild steel alloys and stainless steels having coefficients of the same relative orders will of course suffice. The exact coefficients described are not critical, although a ratio of at approximately 2:1 is convenient and advantageous.

An inspection of the manifold assembly discloses that the stainless steel tubes 28 and 31 form the end walls of an annular reservoir 37, the lateral walls of which include the casing 15 and the T fitting 17 with the ends of the sleeves 21 and 22 disposed therebetween. Similarly, tubes 25 and 34 form the end walls of annular reservoirs 38 and 39 respectively. Casing 12 is one lateral wall, closure 23 is an end wall, and T fitting 17 is a lateral wall of reservoir 38 with the rear edge of sleeve 21 disposed between tube 25 and fitting 17. Reservoir 39 has a forward annular wall 41 welded to sleeve 42 which extends into stuffing box 43 mounted on turbo-supercharger 11. Longitudinal thermal expansion of sleeve 42 is permitted by its slip joint engagement with the stuffing box. Slip joints are seen to be present at 45, 46, 47, 48, 49, and 50. Although the elements forming these joints are well machined, there will nevertheless be some leakage therethrough because of the pressure of the exhaust gases. But the chambers or reservoirs 37, 38, and 39 adjacent these joints (excepting joint 50) are in communication therewith and will receive the escaping gas which will pass thereto along the paths indicated by the arrows.

Lagging 51 (Fig. 1) is provided to enclose substantially the entire manifold assembly. Heat will thus be prevented from radiating to any great extent from the inner transfer and reservoir members, and consequently all the members of the assembly will be subjected to substantially the same thermal operating conditions. From an inspection of the arrangement of the reservoir casings in relation to the T joints and sleeves comprising the main conduit, it is readily seen that the length of sleeve 21 from its middle line to its forward end and the length of the casing 15 from its middle line to its rear end can be predetermined in relation to the projected axial length of the connecting tube 28 so that their total length will expand in an amount that will be fully compensated by the axial expansion of the tube. Similarly, compensation is provided for by tubes 25, 31, and 34 as they connect, respectively, sleeve 21 and casing 12, sleeve 22 and casing 15, and sleeve 22 and casing 13.

While there has been hereinbefore described an improved embodiment of this invention, it will be understood that many and various changes and modifications in form, arrangement of parts and details of construction may be made without departing from the spirit of the invention, and that all such changes and modifications as fall within the scope of the appended claims are contemplated as a part of this invention.

The invention claimed and desired to be secured by Letters Patent is:

1. An exhaust manifold for an internal combustion engine having cylinder heads comprising a pair of casings in spaced axial alignment; a third casing overlapping the adjacent ends of the pair in spaced relation thereto; a branch pipe projecting from each casing to collect the exhaust gases from the combustion chambers of the engine said pipes being adapted for rigid mounting upon the cylinder heads; T pipe fittings disposed one within each of the casings and having their cross portions in substantial alignment and their stems in slip fit relation with the branches; a pair of sleeves telescoping the adjacent ends of the adjacent T fittings in overlapping slip fit relation thereto to form a conduit in communication with the branches; flared tubular members connecting, respectively, the rear end of the rear one of the pair of sleeves and the forward end of the rear one of the pair of casings, the forward end of such sleeve and the rear end of the third casing, the rear end of the other of the pair of sleeves and the forward end of the third casing, and the forward end of said other of the pair of sleeves and the rear end of the other of the pair of casings thereby to provide supporting means for the conduit by the casings; a closure for the rear one of the pair of casings; and an outlet for the exhaust gases.

2. In an exhaust manifold for an internal combustion engine having cylinder heads, in combination, a pair of mild steel casings in spaced alignment, a third mild steel casing overlapping the adjacent ends of the first casings in spaced relation thereto, a branch pipe extending from each of said casings to conduct exhaust gases from the combustion chambers of the engine, said pipes being adapted for rigid mounting upon the engine cylinder heads, a mild steel T pipe fitting disposed in each of said casings with their stems in slip joint relation with the branches and with their cross members in spaced alignment with the cross members of the other T fittings, a pair of mild steel sleeves in overlapping slip joint relation to the adjacent ends of adjacent T cross members to form a conduit in communication with the branches, a pair of tubular stainless steel connecting members joining, respectively, the forward end of the rear one of the pair of casings to the rear end of the rear one of the sleeves and the rear end of the other of the pair of casings to the forward end of the other of the sleeves, and a second pair of stainless steel tubular connecting members joining, respectively, the forward end of the rear one of the pair of sleeves to the rear end of the third section and the rear end of the other of the pair of sleeves to the forward end of the third section.

3. A combination, according to claim 2, in which the mild steel of the combination members has a coefficient of thermal expansion of .0000065 per degree Fahrenheit and the stainless steel of the connecting members has a coefficient of thermal expansion of .000011 per degree Fahrenheit.

4. In an exhaust manifold for an internal combustion engine, in combination, a mild steel casing, a pair of inner mild steel casings telescoped into the first casing at the opposite ends thereof and in spaced relation thereto, branch pipes extending from each of the outer and inner casings to conduct exhaust gases from the engine combustion chambers, mild steel T pipe fittings disposed one in each of the outer and inner casings with the T stem in slip joint relation with the branches and the T cross members in spaced alignment with the other T cross members, mild steel sleeves arranged in overlapping slip joint relation to the adjacent ends of the adjacent T cross members thereby to form a conduit in communication with the branches, flared tubular stainless steel connecting members joining, respectively, the forward end of the rear one of the inner casings to the rear end of one of the sleeves and the rear end of the other one of the inner casings to the forward end of the other one of the sleeves, and a second pair of flared tubular stainless steel connecting members, one facing rearwardly and the other forwardly, to join, respectively, the forward end of the rear one of the sleeves with the rear end of the outer casing and the rear end of the other of the sleeves with the forward end of the outer casing, said connecting members serving to support the conduit in the casings.

5. An exhaust manifold for an internal combustion engine having cylinder heads comprising a plurality of branch pipes adapted for rigid securement to the cylinder heads; a casing integral with each branch pipe, said casings being arranged in axial alignment with each other; an exhaust gas conduit disposed in the casings, said conduit including a plurality of tubular T members and a plurality of sleeves, the cross portions of the T members being disposed in telescopic slip fit relation with the sleeves and the stems of the T members being disposed in telescopic slip fit relation with the branch pipes; and tubular connecting members secured to the casings and to the sleeves so that the casings support the sleeves and hence the conduit, the telescopic arrangement of the main conduit members permitting longitudinal thermal expansion thereof in reference to the casings.

6. An exhaust manifold for an internal combustion engine having cylinder heads comprising a plurality of branch pipes adapted for rigid securement to the cylinder heads; a casing integral with each branch pipe, said casings being arranged in axial alignment with each other; an exhaust gas conduit disposed in the casings, said conduit including a plurality of tubular T members and a plurality of sleeves, the cross portions of the T members being disposed in telescopic slip fit relation with the sleeves and the stems of the T members being disposed in telescopic slip fit relation with the branch pipes; and tubular connecting members secured to the casings and to the sleeves so that the casings support the sleeves and hence the conduit, said connecting members consisting of material having a higher coefficient of thermal expansion than the material of which the casing and sleeves consist thereby to provide compensation for the expansion of said elements.

7. An exhaust manifold, according to claim 6, in which the material of the connecting members is stainless steel having a coefficient of thermal expansion of .000011 per degree Fahrenheit and the material of the casing and sleeve is mild steel having a coefficient of thermal expansion of .0000065 per degree Fahrenheit.

8. An exhaust manifold for an internal combustion engine having cylinder heads comprising a plurality of branch pipes adapted for rigid securement to the cylinder heads; a casing integral with each branch pipe, said casings being arranged in axial alignment with each other; an exhaust gas conduit disposed in the casings including a plurality of tubular T members and a plurality of sleeves, the cross portions of the T members being disposed in telescopic slip fit relation with the sleeves and the stems of the T members being disposed in telescopic slip fit relation with the branch pipes; and tubular connecting members secured in hermetically sealed relation to the casings and to the sleeves so that the casings support the sleeves and hence the conduit, and said casings, tubular connecting members, sleeves, and T members defining chambers in communication with the slip joints between the sleeves and the cross portions of the T members and with the slip joints between the branch pipes and the stems of the T members so that exhaust gases escaping through such joints will be captured in said chambers.

9. An exhaust manifold for an internal combustion engine having cylinder heads comprising a plurality of branch pipes adapted for rigid securement to the cylinder heads; a casing integral with each branch pipe, said casings being arranged in axial alignment with each other; an exhaust gas conduit disposed in the casings including a plurality of tubular T members and a plurality of sleeves, the cross portions of the T members being disposed in telescopic slip fit relation with the sleeves and the stems of the T members being disposed in telescopic slip fit relation with the branch pipes; and tubular connecting members secured in hermetically sealed relation to the casings and to the sleeves so that the casings support the sleeves and hence the conduit, said connecting members consisting of material having a higher coefficient of thermal expansion than the material of which the casings and sleeves consist thereby to provide compensation for the expansion of said elements, and said casings, tubular connecting members, sleeves, and T members defining chambers in communication with the slip joints between the sleeves and the cross portions of the T members and the slip joints between the branch pipes and the stems of the T members so that exhaust gases escaping through such joints will be captured in said chambers.

10. An exhaust manifold for an internal combustion engine having cylinder heads comprising a plurality of branch pipes adapted for rigid securement to the cylinder heads; a casing integral with each branch pipe, said casings being arranged in axial alignment with each other; an exhaust gas conduit disposed in the casing including a plurality of tubular T members and a plurality of sleeves, the cross portions of the T members being disposed in slip fit relation with the sleeves and the stems of the T members being disposed in slip fit relation with the branch pipes; and tubular connecting members secured in hermetically sealed relation to the casings and to the sleeves so that the casings support the sleeves and hence the conduit, said casings, tubular connecting members, sleeves, and T members defining chambers in communication with the slip joints between the sleeves and the cross portion of the T members and with the slip joints between the branch pipes and the stems of the T members so that exhaust gas escaping through such joints will be captured in said chambers.

11. In an exhaust manifold for an internal combustion engine having cylinder heads, a main conduit comprising conducting members disposed in slip joint relation to provide for thermal expansion, casings enclosing such conduit in spaced relation thereto, and tubular members whose ends are welded to the casings and to the main conduit to form hermetically sealed joints, said tubular members and casings being so arranged that they define chambers externally of the conduit in communication with the slip joints so that any exhaust escaping through the joints will be captured therein.

ROSS L. FRYER, Jr.

REFERENCES CITED

The following references are of record in the file of this patent:

UNITED STATES PATENTS

| Number | Name | Date |
|---|---|---|
| 2,001,669 | Smith | May 14, 1935 |
| 2,022,982 | Sikorsky | Dec. 3, 1935 |
| 2,262,627 | Whitesell | Nov. 11, 1941 |
| 2,308,757 | Hulsberg | Jan. 19, 1943 |